United States Patent [19]
Piret et al.

[11] Patent Number: 5,877,240
[45] Date of Patent: Mar. 2, 1999

[54] SIZING COMPOSITION FOR GLASS FIBERS FOR REINFORCEMENT OF ENGINEERED THERMOPLASTIC MATERIALS

[75] Inventors: Willy H. Piret, Xhendelesse; Nadia Masson, Olne, both of Belgium

[73] Assignee: Owens Corning Fiberglas Technology, Inc., Summit, Ill.

[21] Appl. No.: 939,031

[22] Filed: Sep. 26, 1997

[51] Int. Cl.⁶ .......................... C08L 63/04; C08L 75/06; C08K 5/54
[52] U.S. Cl. .......................... 523/415; 525/454; 525/528
[58] Field of Search .......................... 523/415; 525/454, 525/528

[56] References Cited

U.S. PATENT DOCUMENTS

| | | | |
|---|---|---|---|
| 4,338,233 | 7/1982 | Das et al. | 523/410 |
| 4,457,970 | 7/1984 | Das et al. | 428/290 |
| 4,533,679 | 8/1985 | Rawlings | 523/204 |
| 4,615,946 | 10/1986 | Temple | 428/361 |
| 4,694,034 | 9/1987 | Lewin | 523/503 |
| 4,745,028 | 5/1988 | Das et al. | 428/391 |
| 5,605,757 | 2/1997 | Klett | 524/512 |

FOREIGN PATENT DOCUMENTS

| | | |
|---|---|---|
| 084152A1 | 7/1983 | European Pat. Off. . |
| 151661A1 | 8/1984 | European Pat. Off. . |
| 021691A2 | 11/1986 | European Pat. Off. . |
| 59-74781 | 4/1986 | Japan . |
| 62-79956 | 4/1987 | Japan . |
| 97//42129 | 11/1997 | WIPO . |

*Primary Examiner*—Peter A. Szekely
*Attorney, Agent, or Firm*—C. Michael Gegenheimer

[57] ABSTRACT

An epoxy and polyurethane-based sizing composition for fibers used in the reinforcement of engineered thermoplastic molded composites, which exhibits improved hydrolytic stability and reduced discoloration.

15 Claims, No Drawings

5,877,240

SIZING COMPOSITION FOR GLASS FIBERS FOR REINFORCEMENT OF ENGINEERED THERMOPLASTIC MATERIALS

TECHNICAL FIELD AND INDUSTRIAL APPLICABILITY

The present invention relates to glass fibers used as reinforcement in polymeric molding compositions. In particular, the present invention provides a sizing composition for use on such fibers to improve the physical properties of the polymeric composites reinforced therewith.

BACKGROUND OF THE INVENTION

It is well known in the art to use glass fibers as reinforcements in the manufacture of molded polymeric composites. Glass fibers do not shrink or stretch in response to changes in atmospheric conditions and thus provide dimensional stability to the resulting composite. Further, the high tensile strength, heat resistance, moisture resistance, and thermal conductivity of glass fibers can improve the mechanical properties of the composite as well.

Glass fibers are commonly manufactured by supplying glass in molten form to a bushing, drawing fibers from the bushing, and then gathering the fibers into a tow or strand. A sizing composition, or chemical treatment, is typically applied to the fibers after they are drawn from the bushing to protect the fibers from breakage during subsequent processing, and to improve the compatibility of the fibers with the matrix resins that are to be reinforced. The sized strands are then typically chopped into lengths suitable for dispersing throughout a matrix resin to form a molding compound that can be molded into shaped composite articles. The strands may be chopped wet or dry (i.e., before or after the sizing composition dries) and the resulting strand segments may be densified and combined to form pellets, if desired. The strand segments or "chopped strand" is then typically dispersed throughout the matrix resin via an extrusion operation commonly referred to as compounding, to form a molding composition that can be molded into fiber-reinforced composite articles The size compositions applied to the fibers to reduce interfilament abrasion and improve the chemical coupling between the fiber and the polymer matrix typically comprise one or more film-forming polymeric or resinous components, lubricants and glass-resin coupling agents dissolved or dispersed in water. However, in addition to improving the processability of the fiber and the fiber-polymer coupling, the sizing composition should also enhance the wetting of the individual fibers by the matrix resin.

Accordingly, in view of the dual role of the sizing compositions in improving processability of the fibers while improving the physical properties of the resulting composite, as well as the vast variety of polymeric materials that can be advantageously reinforced with glass fibers, a continuing need exists for specifically tailored sizing compositions that provide enhanced physical properties and appearance to articles molded from specific polymeric matrix materials.

SUMMARY OF THE INVENTION

The present invention provides an improved sizing composition for glass fibers used in the reinforcement of polyester-based engineered thermoplastic materials such as polyethylene terephthalate, polybutylene terephthalate and blends thereof, alone or in combination with other thermoplastic materials. Additionally, the present invention provides sized glass fibers for use as reinforcement in molded polymeric articles.

The sizing composition of the invention comprises: (a) a first film-forming polymeric composition comprising a thermoplastic polyurethane; (b) a second film-forming composition comprising an epoxy-cresol-novolac resin and bisphenol F; (c) one or more silane coupling agents; and (d) water. The composition of the invention is easily formulated and applied to glass fibers, imparts good processability to such fibers during the manufacture of engineered thermoplastic composites, and imparts improved physical properties to the resulting composites. In particular, the sizing composition of the invention provides improved hydrolytic stability to the resulting composite articles.

DETAILED DESCRIPTION AND PREFERRED EMBODIMENTS OF THE INVENTION

Injection-moldable engineered thermoplastic materials are typically formed by dispersing glass fibers throughout a molten polymer, and forming the resulting composite into pellets or beads that can be subsequently remelted and injection molded into composite articles. This is commonly referred to as compounding, and is typically accomplished by feeding chopped fiber strands or pellets into an extruder in combination with pellets of the thermoplastic matrix polymer. As the materials pass through the extruder, the thermoplastic polymer softens or melts, and the glass fiber strands or pellets are torn apart and the fibers dispersed throughout the molten polymer.

However, to achieve the greatest benefit from the inclusion of the glass fiber reinforcement in the resulting composite article, it is important that degradation or breakage of the glass filaments be minimized during compounding, and that the fiber strands or pellets be separated into individual filaments uniformly distributed throughout the polymer matrix. The ability to accomplish both of these desired objectives during compounding are enhanced by coating the glass fibers with the sizing composition of the present invention. Specifically, the size composition of the invention provides good protection to the filaments to prevent damage during compounding, and facilitates dispersion of the fibers throughout the molten polymer. The size composition also exhibits good compatibility with the matrix resin being reinforced and provides the resulting composites with improved physical property retention after exposure to humid environments.

The size composition of the present invention comprises, as a first film-former, a thermoplastic polyurethane, which preferably exhibits no crosslinking and melts at a temperature of from about 250° to about 400° C. Although polyether-based polyurethanes can be used, the polyurethane is preferably formed from the reaction product of a polyester diol and a diisocyanate e.g. a saturated polyrster and a diisocyanate. Preferred diisocyanates are aliphatic diisocyanates such as isophorone diisocyanate, 4,4'-dicyclohexylmethane diisocyanate, or blends thereof. Other suitable diisocyanates include, for example, 2,6-toluene diisocyanate, 4,4'-diphenylmethane diisocyanate, 1,5-naphthalene diisocyanate, 1,6-hexamethylene diisocyanate, 4,6'-xylene diisocyanate, para-phenylene diisocyanate, cyclohexyl diisocyanate, 3,3'-tolidene 4,4'-diisocyanate, and 3,3'-dimethyl-diphenylmethane 4,4'-diisocyanate.

More particularly, the preferred polyester-based polyurethane is a polyurethane ionomer which includes pendant ionic groups such as sulfonate or carboxylate groups which facilitate formation of stable dispersions of the polyester-based polyurethane in water. Specific polyester-based polyurethanes preferred for use in the present invention are Baybond MWH 0948 (a polyester polyurethane anionic dispersion prepared from isophorone diisocyanate (IPDI) and hexamethylene diisocyanate (HDI) with anionic sulfonate groups (sodium salt), having 40% solids, a pH of 7.7, and a viscosity according to DIN 53211 of 12 S), and Baybond MWH 0949 (a polyester polyurethane anionic dispersion prepared from IPDI and HDI with anionic carboxylate groups (sodium salt), having 40% solids, a pH of 8.7, and a viscosity according to DIN 53211 of 13 S) which do not contain organic solvent or blocked isocyanate groups capable of crosslinking, and which are commercially available from Bayer.

Other useful polyester-based polyurethanes include Impranil DLS™, an aliphatic polyester-based polyurethane also available from Bayer which contains about 50% by weight solids; Neoxil® 9851, an aliphatic-cycloaliphatic polyurethane resin in the form of a nonionic water emulsion available from DSM Savid; and Baybond® PU 402 and Baybond® PU 401 (anionic polyester urethane polymer dispersions), both of which are commercially available from Bayer.

In addition to the polyurethane, the sizing composition of the invention further contains a second film-former comprising a blend of bisphenol F and an epoxy cresol novolac ("ECN") resin. Although epoxy resins are commonly included in the sizings of glass fibers intended for use in the reinforcement of engineered thermoplastics such a polybutylene terephthalate due to the ability of the epoxy to act as a chain extender to increase the molecular weight of the matrix polymer chains which are typically reduced during compounding, their inclusion often causes undesirable discoloration of the molded composite. However, in accordance with the present invention, it has been discovered that such discoloration can be advantageously reduced by the addition of bisphenol F to the sizing composition in combination with an ECN resin.

Preferably the epoxy cresol novolac resins used in this invention are derived from an orthocresolformaldehyde novolac reacted with epichlorohydrin to form a polyepoxide. Preferred of such resins are those having a molecular weight of from about 935 to about 1400, an epoxy equivalent weight of from about 210 to about 235, and a melting point of from about 35° C. to about 99° C. The amount of bisphenol F in the blend should be such that the ECN resin does not become sticky under shear at temperatures up to about 40° C. Accordingly, the amount of bisphenol F that may be included in the formulation depends on the particular ECN resin. The higher the molecular weight of the ECN resin, generally the more bisphenol F that can be added to the formulation.

Preferably the second film-former comprises an aqueous dispersion of bisphenol F and epoxy cresol novolac resin containing, on a weight percent solids basis, from about 20 to about 55 percent bisphenol F and about 80 to about 45 percent epoxy cresol novolac resin having a molecular weight of from about 935 to about 1400, more preferably from about 45 to about 55 percent bisphenol F and about 55 to about 45 percent epoxy cresol novolac resin. A particularly preferred blend comprises 50 percent by weight of bisphenol F commercially available as a resin from Ciba Specialty Chemicals under the trade designation GY281 and 50 percent by weight of an epoxy cresol novolac resin containing a non-ionic octylphenol surfactant with (EtO) n>30, commercially available from Ciba Specialty Chemicals as a resin under the trade designation ECN1280. Such blends are presently available from Ciba Specialty Chemicals as an aqueous dispersion under the designations RD96156 and XU3787. RD96156 has a solids content of from about 50 to about 55 percent, an average particle size of less than 3 microns, a viscosity at 25° C. of from about 8,000 to about 20,000 mPa.S and an epoxy equivalent weight (EEW) of from about 210 to about 230. XU3787 is a more diluted dispersion having a solids content of from about 43 to about 48 percent and a viscosity at 25° C. of from about 8,000 to about 12,000 mPa.S.

The size composition of the invention also preferably includes one or more silane coupling agents. The silane coupling agents function to enhance the adhesion of the film forming polymers to the glass fibers, to reduce the level of fuzz, or broken fiber filaments during processing. Two preferred coupling agents for use in the sizing composition are gamma-glycidoxypropyltrimethoxy silane and gamma-aminopropyltriethoxy silane commercially available from OSI Specialties under the trade designations A187 and A1100, respectively. Also suitable for use is a hydrolyzed A1100 solution in water, which is commercially available from OSI Specialties under the designation VS142 (40% solution) or from Huls under the designation A1151 (40% solution).

The size composition further comprises an amount of water sufficient to dissolve or disperse the active solids for coating. Preferably, the weight percentage as total solids of the first film former, second film former, and coupling agents in the composition is from about 8 to about 29 weight percent. Moreover, of these total solids, preferably from about 5 to about 25 percent are attributable to the first film-former (polyurethane), from about 55 to about 90 percent are attributable to the second film-former (ECN/bisphenol), and from about 5 to about 20 percent are attributable to the coupling agents. More preferably, the first film former accounts for from about 5 to about 20 percent of the total solids, the second film former from about 62 to about 80 percent and the coupling agents from about 10 to about 18 percent, with compositions containing from 10 to about 18 percent of the first film former, about 64 to about 80 percent of the second film former and about 10 to about 18 percent coupling agents generally being most preferred. When both the A187 and A1100 coupling agents are included in the formulation, preferably from about 6.5 to about 11.7 percent of the total solids are attributable to the A187 coupling agent, and from about 3.5 to about 6.3 percent are attributable to the A100 coupling agent. If too little polyurethane is included in the composition, strands or bundles of the sized fibers tend to separately prematurely when the strand is chopped into the segments or pellets used in compounding which undesirably complicates their handling during the compounding procedure. However, if too much polyurethane is included in the composition, the polyurethane can encapsulate the epoxy resin which reduces its ability to serve as a chain extender for the matrix polymer and can reduce the physical properties of the resultant composite.

The size composition may optionally include pH adjusting agents, such as an organic acid or a base, in an amount sufficient to provide the size composition with a pH of from about 5.3 to about 9.3. Preferred pH adjusting agents include acetic acid and ammonium hydroxide.

The size composition may also optionally include a processing aid, such as a lubricant or antifoaming agent, to facilitate manufacturing. For example, a small amount, preferably no more than about 0.03 percent by weight of the size composition, of a conventional water-based lubricant may be employed. Exemplary lubricants that may be optionally added to the size compositions of the invention include one or more of the following: a nonionic surfactant, e.g., a block copolymer of ethylene oxide and propylene oxide such as Pluronic L101 (available from BASF) or Synperonic PE/Ll01 (available from ICI), or octylphenoxypolyethoxyethanol such as Triton X100 (available from Rohm and Haas); a polyvinyl pyrrolidone, e.g., a Luviskol K grade (available from BASF); an imidazoline, e.g., an alkylimidazoline derivative such as Tego cationic softener (available from Th.Goldschmidt AG); or a polyethyleneimine polyamide salt, e.g., Emery 6760 (available from Henkel Corp.). Additionally, the inclusion of a small amount of an antifoam agent, preferably no more than about 0.03 percent by weight of the composition, is generally preferred. Suitable antifoam agents include a polydimethylsiloxane liquid antifoam additive commercially available from Dow Corning under the trade designation DC1520.

The size composition is preferably prepared by diluting and mixing each of the first film-former (polyurethane), second film-former (ECN/bisphenol dispersion), and coupling agents (A187 and A1100) separately with water to form a premix, and then combining the premixes in a main mixing tank. The pH of the mixture may be controlled as necessary by adding pH adjusting agents to the premixes, or to the final mixture. For example, acetic acid is preferably added to the A1100 coupling agent premix as needed to reach a pH of from about 7 to about 7.3. Similarly, the A187 premix is prepared by first hydrolyzing the A187 coupling agent in water with the help of acetic acid which lowers the pH of the solution to about 4, and then ammonium hydroxide is preferably added to the premix as needed to raise the pH to about 7 to about 7.3. After all of the premixed materials are added to the main mix tank, a sufficient amount of water is added to obtain a total solids content in the composition of from about 8 to about 29 weight percent.

The size composition may be prepared and applied using suitable equipment and techniques known in the art. For example, the size composition may be applied to the fibers as they exit the bushing using an applicator roller as described in U.S. application Ser. No. 08/311,817, filed Sep. 26, 1994, the disclosure of which is hereby incorporated by reference.

To prepare fibers for use in the reinforcement of engineered thermoplastics, the size composition is preferably applied to fibers having a diameter of from about 6 to about 20 microns, with fibers of from about 10 to about 14 microns in diameter being more preferred. Further, the size is preferably applied to the fibers and dried such that the size is present on the fibers in an amount of from about 1.0 to about 2.0 percent by weight based on the total weight of the fibers. This can be determined by the loss on ignition (LOI) of the fiber rovings, which is the reduction in weight experienced by the fibers after heating then to a temperature sufficient to burn or pyrolyze the organic size from the fibers. To achieve the desired solids content on the fibers, the amount of water added to dilute the size mixture may be varied.

In the production of the sized glass fibers for the reinforcement of engineered thermoplastic materials, the size-coated fibers are collected into a multi-filament strand or roving and chopped, wet or dry, into segments of the desired length. If the strands are wet-chopped, the resulting strand segments are then heated to a temperature of from about 150° C. to about 220° C. for a period of from about 30 seconds to about 3 minutes to dry and cure the sizing composition. Additionally, if desired, the wet chopped strands may be formed into pellets prior to heating to dry and cure the sizing composition. A suitable method for forming such pellets is disclosed in U.S. Patent application Ser. No. 08/831,129, which is copending herewith, the disclosure of which is incorporated herein by reference.

For the reinforcement of injection molded composite articles, the size-coated chopped glass fibers of the invention are then compounded with a suitable thermoplastic matrix resin to form an injection-moldable composition. While the size-coated fibers of the invention can be used with a wide range of thermoplastic materials, they are particularly well-suited for the reinforcement of polyester-based engineered thermoplastic materials. Such materials include polyethylene terephthalate, polybutylene terephthalate, mixtures of polyethylene terephthalate and polybutylene terephthalate, and blends thereof with other thermoplastic materials.

In order that the invention may be more readily understood, reference is made to the following examples, which are intended to be illustrative of the invention, but are not intended to be limiting in scope.

EXAMPLE 1

A size composition in accordance with the present invention was prepared by diluting 108 kg RD 96156 at 53% solids (Ciba Specialty Chemicals) in 220 liters of demineralized water. The solution was mixed for 15 minutes and then transferred to a main mix tank. Next 28 kg of Baybond MWH 948 (Bayer) was diluted in 80 liters of demineralized water, mixed for 15 minutes and transferred to the main tank. Next, 7.911 kg of A-1100 (OSI Specialties) was diluted in 150 liters of demineralized water and stirred for 15 minutes. To this, 2.11 kg of Glacial acetic acid (99%) was then added to bring the mixture to a pH of 7 to 7.5. When such a pH was reached, the mixture was transferred to the main mix tank. Next, 10.789 kg of A187 (OSI Specialties) was diluted in 210 liters of demineralized water and stirred for 5 minutes. To this was added 1.079 kg of acetic acid, and the resulting solution was then stirred for 30 minutes. To this, 1.1 kg of a 29% ammonium hydroxide solution was then added to bring the mixture to a pH of 7 to 7.5. When such a pH was reached, the mixture was transferred to the main mix tank. Thereafter, water was added to the main mix tank to bring the total volume of the mix to 800 liters.

The prepared size composition was applied to fibers ranging in diameter from 10 to 14 microns as they exited a bushing using a conventional in-line graphite applicator roller. The resulting size-coated fibers were then chopped and dried by pasing the chopped fibers through a fluidized bed oven having an above glass temperature of about 190° C. and a dwell time of about 2 minutes.

The size-coated fibers of the invention (Size A), and fibers coated with prior commercial formulations (sizes B and C), were then compounded with Vestodur 1000 (a polybutylene terephthalate resin commercially available from Huls) or a flame retardant modified polybutylene terephthalate formulation in a screw extruder to disperse the fibers throughout the resin to form a moldable composition. The moldable composition was then injection molded into test specimens for physical property determinations on the resulting composites. The results of these determinations are set forth in Tables 1 and 2 for the Vestodur 1000 and the flame retardant composites, respectively, and include the results of measurements taken after extended exposure to water. As can be seen, the size composition of the invention exhibits significantly higher tensile after 50 hour hydrolysis in pressure vessel at 120° C. Additionally, fibers sized with the composition of the invention also exhibit better izod and charpy unnotched values in an unmodified polybutylene terephthalate (Vestodur 1000). Further, as evidenced by the following test results, the properties obtained also depend on the diameter of the fiber, with smaller fiber diameters generally providing better properties.

TABLE 1

Vestodur 1000

| Sizing | A | A | B | C | C | C | C | C | C |
|---|---|---|---|---|---|---|---|---|---|
| Fiber length (mm) | 4.5 | 4.5 | 4.0 | 4.0 | 4.0 | 4.0 | 4.0 | 4.0 | 4.0 |
| Nominal Fiber diameter (microns) | 10 | 10 | 14 | 10 | 11 | 12 | 13 | 14 | 12 |
| Size coating weight % | | | | | | | | | |
| Glass content | 29.44 | 30.78 | 29.97 | 28.6 | 28.68 | 30.1 | 30.12 | 28.76 | 32.69 |
| Tensile (MPA) ISO | 149.62 | 153 | 136.5 | 149.42 | 146.9 | 145.88 | 139.44 | 133.86 | 148.98 |
| C Tensile (MPA) ISO* | 151 | 151 | 137 | 154 | 151 | 146 | 139 | 137 | 142 |
| Tensile (MPA) ISO 50H Hydr. | 69.1 | 69.08 | 108.92 | 120.9 | 119.86 | 120.12 | 112.62 | 108.89 | 123 |
| C Tensile (MPA) ISO 50H Hydr.* | 69 | 69 | 109 | 124 | 123 | 120 | 112 | 111 | 118 |
| Izod unnotched (KJ/M2) | 57.81 | 59.09 | 53.77 | 68.23 | 64.23 | 65.3 | 58.24 | 52.61 | 61.57 |
| C Izod unnotched (KJ/M2)* | 59 | 58 | 54 | 71 | 67 | 65 | 58 | 54 | 58 |
| Izod notched (KJ/M2) ISO | 11.32 | 11.53 | 10.52 | 11.22 | 10.88 | 11.03 | 11.18 | 10.43 | 11.79 |
| C Izod notched (KJ/M2) ISO* | 12 | 11 | 11 | 12 | 11 | 11 | 11 | 11 | 11 |
| Charpy unnotched (KJ/M2) ISO | 49.74 | 54.51 | 54.49 | 63.3 | 61.52 | 60.5 | 57.87 | 54.57 | 59.62 |
| C Charpy unnotched (KJ/M2) ISO* | 50 | 54 | 55 | 66 | 64 | 60 | 58 | 56 | 56 |

*Corrected for 30% glass loading by weight.

TABLE 2

Flame Retardant Polybutylene Terephthalate Formulation

| Sizing | A | A | B | C | C | C | C | C | C |
|---|---|---|---|---|---|---|---|---|---|
| Fiber length (mm) | 4.5 | 4.5 | 4.0 | 4.0 | 4.0 | 4.0 | 4.0 | 4.0 | 4.0 |
| Fiber diameter (microns) | 10 | 10 | 14 | 10 | 11 | 12 | 13 | 14 | 12 |
| Size coating weight % | | | | | | | | | |
| Glass content | 30.44 | 31.34 | 30.64 | 30.67 | 30.09 | 29.78 | 31.07 | 29.43 | 30.72 |
| Tensile (MPA) ISO | 151.56 | 151.58 | 134.46 | 149.54 | 147.06 | 144.02 | 141.9 | 133.18 | 141.48 |
| C Tensile (MPA) ISO* | 150 | 148 | 133 | 148 | 147 | 145 | 139 | 135 | 140 |
| Tensile (MPA) ISO 50H Hydr. | 80.58 | 77.42 | 91.94 | 112.58 | 113.46 | 110.92 | 110.54 | 101.42 | 106.1 |
| C Tensile (MPA) ISO 50H Hydr.* | 80 | 77 | 91 | 112 | 113 | 109 | 102 | 105 | |
| Tensile (MPA) ISO 100H Hydr. | 43.97 | 44.9 | 45.72 | 66.64 | 59.14 | 59.26 | 59.18 | 50.64 | 58.72 |
| Izod unnotched (KJ/M2) | 49.53 | 45.57 | 39.76 | 49.14 | 47.17 | 43.49 | 40.66 | 33 | 45.22 |
| C Izod unnotched (KJ/M2)* | 49 | 44 | 39 | 48 | 47 | 44 | 40 | 33 | 44 |
| Izod notched (KJ/M2) ISO | 9.14 | 8.46 | 8.73 | 8.19 | 7.89 | 8.39 | 8.08 | 7.66 | 7.99 |
| C Izod notched (KJ/M2) ISO* | 9 | 8 | 9 | 8 | 8 | 8 | 8 | 8 | 8 |
| Charpy unnotched (KJ/M2) ISO | 43.66 | 44.42 | 38.12 | 49.79 | 45.83 | 44.5 | 44.39 | 37.9 | 42.62 |
| C Charpy unnotched (KJ/M2) ISO* | 43 | 43 | 38 | 49 | 46 | 45 | 43 | 38 | 42 |

*Corrected for 30% glass loading by weight.

The above description of the invention has been made to illustrate preferred features and embodiments of the invention. Other embodiments and modifications will be apparent to skilled artisans through routine practice of the invention. For example, while the size composition is described as being applied to glass fibers, it should be appreciated that the size may also be applied to non-glass fibers including synthetic fibers such as Kevlar®, carbon or graphite fibers, silicon carbide (SiC) fibers, and polymeric fibers. Thus, the invention is intended not to be limited to the features and embodiments described above, but to be defined by the appended claims and equivalents thereof.

What is claimed is:

1. A size composition for treating fibers useful to reinforce polymeric materials comprising:

a. a first film former comprising a thermoplastic polyurethane;

b. a second film former comprising a mixture of bisphenol F and an epoxy-cresol-novolac resin;

c. one or more silane coupling agents; and d. water.

2. The size composition of claim 1, wherein said polyurethane does not crosslink.

3. The size composition of claim 2, wherein said polyurethane comprises a reaction product of a saturated polyester and a diisocyanate.

4. The size composition of claim 3, wherein said polyurethane is in the form of an anionic dispersion.

5. The size composition of claim 1, wherein said epoxy-cresol-novolac resin has a weight average molecular weight of from about 935 to about 1400.

6. The size composition of claim 5, wherein said epoxy-cresol-novolac resin has an epoxy equivalent weight of from about 210 to about 235.

7. The size composition of claim 6, wherein said second film-former comprises, on a weight percent solids basis, from about 20 to about 55 percent bisphenol F and from about 45 to about 80 percent epoxy-cresol-novolac resin.

8. The size composition of claim 1, wherein said one or more silane coupling agents is selected from the group consisting of gamma-glycidoxypropyltrimethoxy silane and gamma-aminopropyltriethoxy silane.

9. The size composition of claim 8, wherein said composition comprises gamma-glycidoxypropyltrimethoxy silane and gamma-aminopropyltriethoxy silane.

10. The size composition of claim 1 having a pH of from about 5 to about 9.

11. The size composition of claim 1, wherein the first film former is present in amount, based on total solids, of from about 5 to about 25 percent by weight, the second film former is present in an amount, based on total solids, of from about 55 to about 90 percent by weight, and the silane coupling agent is present in an amount, based on total solids, of from about 5 to about 20 percent by weight.

12. An aqueous size composition for treating glass fibers useful to reinforce polymeric materials comprising:

a. from about 5 to about 25 percent by weight based on total solids of a first film former comprising a polyester-based thermoplastic polyurethane;

b. from about 55 to about 90 percent by weight based on total solids of a second film former comprising a mixture of bisphenol F and an epoxy-cresol-novolac resin; and c. from about 5 to about 20 percent by weight based on total solids of a silane coupling agent.

13. The size composition of claim 12 further comprising an amount of an organic acid such that said composition has a pH of from about 5 to about 9.

14. The size composition of claim 12, wherein said polyester-based thermoplastic polyurethane has been formed from a saturated polyester.

15. The size composition of claim 12, wherein said second film former comprises from about 20 to about 55 percent bisphenol F and from about 45 to about 80 percent epoxy-cresol-novolac resin.

* * * * *